United States Patent

[11] 3,569,743

[72] Inventor Lee R. Baessler
Torrance, Calif.
[21] Appl. No. 741,708
[22] Filed July 1, 1968
[45] Patented Mar. 9, 1971
[73] Assignee Thiokol Chemical Corporation
Bristol, Pa.

[54] LINEAR MONOSTABLE MULTIVIBRATOR
4 Claims, 1 Drawing Fig.

[52] U.S. Cl. .......... 307/273,
307/293, 328/207, 331/113
[51] Int. Cl. .......... H03k 3/26
[50] Field of Search .......... 307/218,
221, 273, 293; 328/55, 56, 120, 207; 331/113

[56] References Cited

UNITED STATES PATENTS

| | | | |
|---|---|---|---|
| 2,949,582 | 8/1960 | Silliman | 331/113 |
| 2,987,632 | 6/1961 | Milford | 307/273X |
| 3,025,417 | 3/1962 | Campbell, Jr. | 307/273 |
| 3,048,708 | 8/1962 | Rover | 307/293 |
| 3,188,498 | 6/1965 | Gabor et al. | 307/273 |
| 3,214,602 | 10/1965 | Heyming et al. | 307/273X |
| 3,453,453 | 7/1969 | Hughes | 307/273 |

*Primary Examiner*—Donald D. Forrer
*Assistant Examiner*—R.C. Woodbridge
*Attorney*—Burns, Doane, Benedict, Swecker and Mathis

ABSTRACT: A three transistor linear monostable multivibrator in which the time duration of the unstable condition thereof is linearly responsive to an applied control potential from which value a capacitor is charged from a constant current source to the potential at which the multivibrator switches to its stable condition.

PATENTED MAR 9 1971 3,569,743
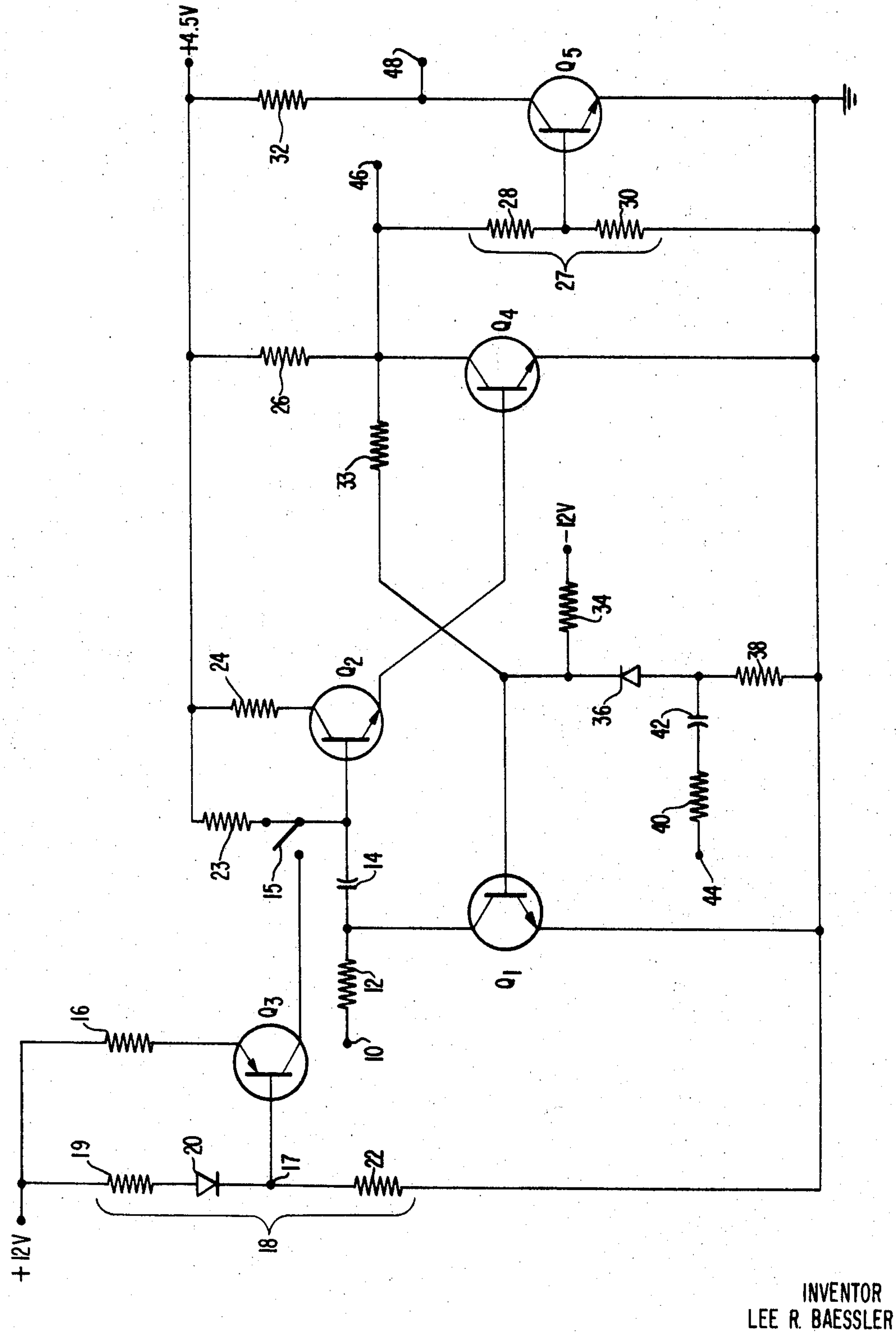
INVENTOR
LEE R. BAESSLER
BY
Burns, Doane, Benedict, Swecker & Mathis
ATTORNEYS

LINEAR MONOSTABLE MULTIVIBRATOR

BACKGROUND OF THE INVENTION

Monostable multivibrators are well known in the art. Such circuits normally comprise cross-coupled transistors having a single capacitor in the coupling of the collector electrode of one transistor to the base of the other transistor. Once triggered by the application of a pulse to the base electrode of the nonconducting transistor to its unstable condition, the multivibrator will so remain for the period of time necessary for the voltage on the capacitor to charge to that potential sufficiently necessary to trigger the transistors to the state of conduction corresponding to the stable condition of the multivibrator.

The capacitor is normally charged during the unstable condition of the multivibrator by the current flowing through the conducting transistor. In such a situation, the charge accumulates on the capacitor in an exponential manner. The unstable period of the multivibrator, i.e., pulse width, may be varied by varying the RC time constant. Unfortunately, neither the resistance nor the capacitance coupling the transistors is easily controllable electronically and the control which results is not linear with the change effected.

It is accordingly a primary object of the present invention to provide a novel linearly adjustable monostable multivibrator in which the time duration of the unstable condition of the multivibrator may be easily adjusted by means of a control voltage.

Another object of the present invention is to provide a novel monostable multivibrator in which the time duration of the unstable condition of the multivibrator is determined by the application of a constant current through a capacitor to raise the potential thereof from an adjustable level to a level sufficient to cause the multivibrator to switch to its stable condition.

Still another object is to provide a novel circuit for producing a pulse having a duration responsive to control voltage.

These and other objects and advantages of the present invention will be readily apparent from the claims and from the detailed description when read in conjunction with the appended drawings.

IN THE DRAWINGS

The FIG. 1 is a schematic diagram of the circuit of the present invention.

DETAILED DESCRIPTION

Referring now to the FIGURE, a control voltage input terminal 10 is connected through a resistor 12 to the collector electrode of a grounded emitter NPN transistor Q1 and across a capacitor 14 to the base electrode of an NPN transistor Q2.

The collector electrode of a PNP transistor Q3 is also connected through a switch switch 15 to the base electrode of the transistor Q2. The emitter electrode of the transistor Q3 is connected through a biasing resistor 16 to a 12-volt source of positive potential. The base electrode of the transistor Q3 is connected to a terminal 17 of a voltage divider network 18 connected between the 12-volt source of a positive potential and ground. The voltage divider network 18 comprises a resistor 19, a diode 20, and a resistor 22. The diode 20 is included to insure the unidirectional flow of current through the voltage divider network 18 and to provide temperature compensation for the transistor Q3. The relative values of the resistors 19 and 22 determine the potential at the terminal 17.

The collector electrode of the transistor Q2 is connected through a biasing resistor 24 to a 4.5-volt source of positive potential. The base electrode of the transistor Q2 may also be connected through the switch 15 and a resistor 23 to the 4.5-volt source of positive potential. The emitter electrode of the transistor Q2 is directly connected to the base electrode of a grounded emitter NPN transistor Q4. The collector electrode of the transistor Q4 is connected through a biasing resistor 26 to the 4.5-volt source of positive potential.

A voltage divider 27 comprising resistor 28 and 30 is connected across the emitter-collector electrodes of the transistor Q4. The resistors 28 and 30 junction is directly connected to the base electrode of a grounded emitter NPN transistor Q5. The collector electrode of the transistor Q5 is connected through a resistor 32 to the 4.5-volt source of positive potential.

The collector electrode of transistor Q4 is also connected through a resistor 33 to the base electrode of the transistor Q1. A 12-volt source of negative potential is also connected through a resistor 34 and across a diode 36 and resistor 38 to the base electrode of the transistor Q1. A trigger input terminal 44 is connected to the diode 36 and resistor 38 junction through a resistor 40 and a capacitor 42.

The true output of the circuit is taken from a terminal 46 at the collector electrode of the transistor Q4. The supplying circuit or false output of the circuit is taken from a terminal 48 at the collector electrode of the transistor Q5.

The operation of the circuit of the present invention may be more easily understood by eliminating from initial consideration the current supplying circuit of the transistor Q3 and the inverted or false output supplying circuit comprising resistors 28, 30 and 32 and the transistor Q5.

Assume then that the switch 15 is operated to break the connection between the collector electrode of the transistor Q3 and the base electrode of the transistor Q2 and to connect the base electrode of the transistor Q2 through the resistor 23 to the 4.5-volt source of positive potential. Assume further that a positive 4.5 volts is applied to the control voltage terminal 10. The circuit including transistors Q1, Q2 and Q4 then comprises a monostable multivibrator.

In the steady state condition of the multivibrator, transistor Q2 is conducting sufficiently to apply a positive potential to the base electrode of transistor Q4. The application of a positive potential to the base electrode of the transistor Q4 causes the saturation thereof effectively grounding the collector electrode to provide a substantially ZERO output on the terminal 46.

The grounding of the collector electrode of the transistor Q4 also removes the influence of the negative 12-volt source opposing 4.5-volt source of positive potential as applied through the resistors 26 and 33 to the base electrode of the transistor Q1. The potential of the base electrode of the transistor Q1 thus becomes solely responsive to the negative 12-volt source applied through the resistor 34 which drives the transistor Q1 into cutoff.

The application of a positive going trigger pulse to the trigger input terminal 44 increases the potential of the base electrode transistor Q1 sufficiently to cause the saturation thereof. The saturation of transistor Q1 effectively grounds the collector electrode of the transistor Q1 removing the 4.5-volt control voltage applied to the terminal 10 from the left hand side of the capacitor 14 and providing a capacitor 14 charging circuit from the 4.5-volt source of bias voltage through the resistor 23 to ground.

The positive potential is thus removed from the base electrode of the transistor Q2 for the period of time necessary for the capacitor 14 to charge to the potential at which the transistor Q2 will again conduct. The transistor Q4 is driven into cutoff during this period by reduction in the potential of its base electrode. The output of the multivibrator as taken from the terminal 46 is a binary ONE of approximately 4.5 volts positive potential. The output at the terminal 48 will, of course, by be a binary ZERO during this period.

The multivibrator is in its unstable state during this period and, as stated, will so remain for a time dependent upon accumulation of the requisite charge on the capacitor 14. The duration of the unstable condition of the multivibrator determines the width of the positive output pulse on the terminal 46.

The capacitor 14 is charged from the control voltage on terminal 10 through the base to emitter paths of the transistors Q2 and Q4 to approximately 4 volts, the voltage drop across the transistors Q2 and Q4 being relatively small. The base electrode of the transistor Q2 thus becomes approximately 4 volts below ground potential due to the charge on the capacitor 14 when the transistor Q1 saturates in response to the application of a triggering pulse to the terminal 44. This potential increases exponentially from the negative 4.0 volts towards a positive 4.5 volts as the capacitor 14 charges from the 4.5-volt source through the resistor 23. The transistor Q2 begins to conduct as potential on the base electrode rises slightly above ground causing the saturation of transistor Q4 and the cutoff of transistor Q1 thus switching the multivibrator back to its stable condition.

The operation of the switch 15 to connect the current source circuit of transistor Q3 to the base electrode of the transistor Q2 in place of the 4.5-volt source and the resistor 23 modifies the operation of the multivibrator. When the multivibrator is triggered to its unstable condition by the application of a positive going signal to the terminal 44, the potential at the base electrode of transistor Q2 will drop to substantially the value below ground the of the control voltage applied to the terminal 10 in the manner earlier described. The potential on the base electrode of transistor Q2 will then increase towards a positive 12 volts as the capacitor 14 charges through the resistor 16 and the emitter-collector paths of the transistors Q1 and Q3. Since the current supplied by the transistor Q3 is a constant due to the emitter-base voltage relationship, this increase in the potential of the base electrode is linear. The duration of the unstable period of the multivibrator is thus directly and linearly related to the potential of the control voltage applied to terminal 10 since this voltage level is the potential assumed by the capacitor 14 in the stable condition of multivibrator and thus the negative potential from which the capacitor 14 must charge to the potential at which the transistor Q2 conducts.

Exemplary values of the electrical components of the preferred embodiment are as follows:

| | |
|---|---|
| Resistor 12 and 34 | 220 K ohms |
| Resistor 16 | 270 K ohms |
| Resistor 19 | 7.5 K ohms |
| Resistor 22 | 3.9 K ohms |
| Resistor 24 | 68 K ohms |
| Resistor 26 and 32 | 4.7 K ohms |
| Resistor 28, 30 and 40 | 33 K ohms |
| Resistor 33 | 18 K ohms |
| Resistor 38 | 47 K ohms |
| Capacitor 14 | 1.0 micro farad |
| Capacitor 42 | 0.01 micro farad |
| Diodes 20 and 36 | 1N56A |
| Transistor Q1 | 2N2714 |
| Transistor Q2 and Q4 | 2N2925 |
| Transistor Q3 | 2N3638 |
| Transistor Q5 | 2N2714 |

The invention may be embodied in other specific forms without departing from the sprii spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to embraced therein.

I claim:

1. A linear monostable multivibrator comprising:
a capacitor;
first and second transistors having base, emitter, and collector electrodes, the collector electrode of said first transistor being connected to the base electrode of said second transistor through a resistor network, the collector electrode of said transistor being connected through said capacitor to the base electrode of said first transistor, said first transistor being biased to conduct in the stable condition of the multivibrator and said second transistor being biased to conduct in the unstable condition of the multivibrator;
trigger means for causing the multivibrator to switch to its unstable condition;
a source of constant current for charging said capacitor;
means responsive to the accumulation of a predetermined charge on said capacitor for switching the multivibrator to its stable condition; and
variable potential means for controlling the potential which said capacitor assumes upon the switching of the multivibrator to its unstable condition, the period of time of the unstable condition of the multivibrator being linearly related to the potential of said variable potential means.

2. The method of producing an output pulse having a predetermined width linearly related to an input potential comprising the steps of:
a. providing a multivibrator including cross coupled transistors having base, collector and emitter electrodes and a capacitor connected between the base electrode of one of the transistors and the collector electrode of the other one of the transistors;
b. charging the capacitor to a predetermined input potential during the stable condition of the multivibrator;
c. switching the multivibrator to its unstable condition to remove the potential from one side of the capacitor; and
d. charging the capacitor from the potential existing on the other side of the capacitor immediately after the switching of the multivibrator to its unstable condition to a predetermined potential at which the multivibrator switches to its stable condition from a constant current source whereby the potential to which the capacitor is charged during the stable condition of the multivibrator is linearly related to the time interval necessary to charge the capacitor to the predetermined switching potential and thus the width of the output pulse.

3. A linear monostable multivibrator comprising:
a capacitor;
first and second transistors having base, emitter, and collector electrodes, the collector electrode of said first transistor being connected to the base electrode of said second transistor through a resistor network, the collector electrode of said second transistor being connected through said capacitor to the base electrode of said first transistor, said first transistor being biased to conduct in the stable condition of the multivibrator and said second transistor being biased to conduct in the unstable condition of the multivibrator;
trigger means for causing the multivibrator to switch to its unstable condition;
a source of constant current for charging said capacitor through said second transistor;
means responsive to the accumulation of a predetermined charge on said capacitor for switching the multivibrator to its stable condition; and
means for controlling the potential which said capacitor assumes upon the switching of the multivibrator to its unstable condition whereby the time interval necessary to charge said capacitor to said predetermined potential and thus the width of the output pulse may be linearly controlled.

4. The linear monostable multivibrator of claim 3 wherein said charge responsive means includes a third transistor having base, emitter, and collector electrodes, the collector electrode of said second transistor being connected to the base electrode of said first transistor through the base-emitter junction of said third transistor.

UNITED STATES PATENT OFFICE
CERTIFICATE OF CORRECTION

Patent No. 3,569,743 Dated March 9, 1971

Inventor(s) Lee R. Baessler

It is certified that error appears in the above-identified paten and that said Letters Patent are hereby corrected as shown below:

Column 2, lines 17 and 18, "supplying circuit" should r -- inverted --; line 66, cancel "by". Column 3, line 20, can "the", second occurrence; line 61, after "to" insert -- be - line 69, after "said" insert -- second --.

Signed and sealed this 19th day of October 1971.

(SEAL)
Attest:

EDWARD M.FLETCHER,JR.
Attesting Officer

ROBERT GOTTSCHALK
Acting Commissioner of Pater

FORM PO-1050 (10-69)